July 3, 1962 J. E. GLATT 3,041,917
UNDERWATER INSTRUMENT VIEWING DEVICE
Filed Sept. 24, 1959
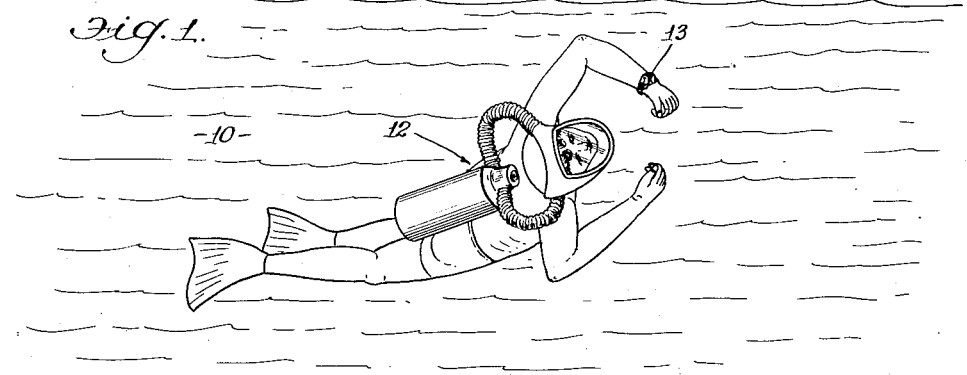
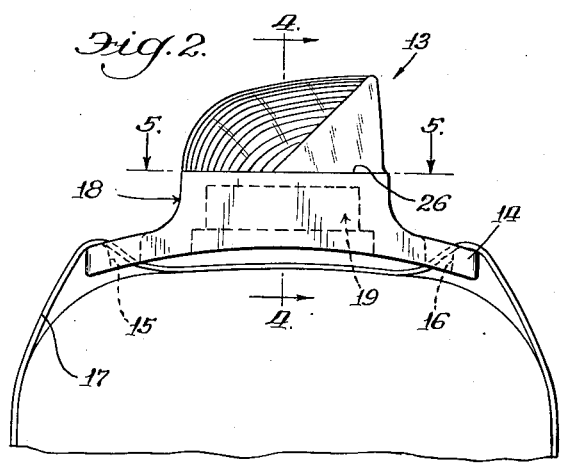
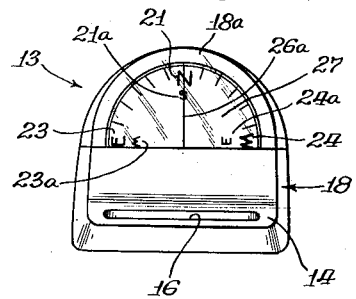
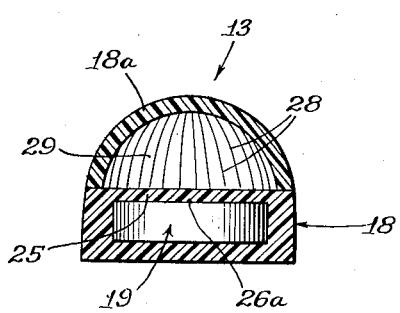
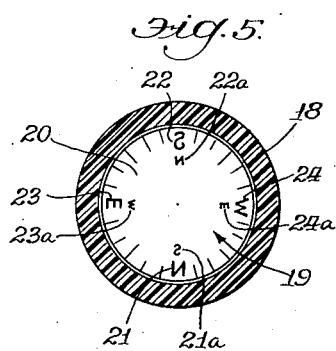
INVENTOR.
Jack E. Glatt
BY Kenneth T. Snow
Atty.

3,041,917
UNDERWATER INSTRUMENT VIEWING DEVICE
Jack E. Glatt, Park Ridge, Ill., assignor of one-third to William L. MacShane, Rolling Meadows, Ill.
Filed Sept. 24, 1959, Ser. No. 842,131
5 Claims. (Cl. 88—1)

This invention relates to a new and improved underwater instrument viewing device.

With the advent of "skin diving" the need for efficiently viewing and reading underwater instruments has increased tremendously. In performing tasks under water it is essential that a diver avoid losing his sense of "attitude" or equilibrium. The instruments referred to herein include a compass, a thermometer, a watch, a depth gauge, or any other instrument which may impart information to a diver while he is under water. Such instruments are usually strapped to the arm or wrist of the diver and it is difficult for the user to adjust the position of his head and to turn his arm to read these wrist strapped-on instruments without sometimes losing his balance and his sense of "attitude" while he is making his excursion through a body of water. A swimmer ordinarily is in a horizontal position while travelling through water and his head is directed forwardly. Redirecting his vision toward a wrist mounted instrument is difficult and it is the purpose of this invention to make reading such instrument easy.

It is therefore a principal object of this invention to provide means associated with wrist mounted instruments for viewing the instruments by the wearer without changing his vision from a forwardly or generally horizontal direction.

Another important object of this invention is the provision of means for transmitting the image of the face of an instrument into a plane substantially at right angles to the instrument whereby when the instrument is worn on the wrist the user may view the instrument without moving his head downwardly.

Another and further important object of this invention is to supply prism means in association with the viewing faces of wrist worn instruments to thereby redirect and project the information on the face of the instruments to a position at right angles thereto for easy viewing by a wearer without lowering his head and thus possibly losing consciousness of his attitude.

Another important object of this invention is to enable a diver to expose only the small side of his wrist, which is the normal skin diving position, and allow the diver to read his instrument while this small side wrist position offers less obstruction to the diver's peripheral vision, and less resistance to the water, when in motion.

Another and still further important object of this invention is to provide a reflecting prism for use in conjunction with the faces of underwater instruments and employing an air pocket surrounding the surface of the prism to avoid the neutralizing or cancelling effect of water on the prism whereby a viewer may view the face of the instrument through the face of the prism at a considerable angle with respect to the normal disposition of the face of the instrument.

A still further important object of this invention is to facilitate the reading of an instrument at substantially right angles to the normal disposition of the face of that instrument and to simultaneously draw in light from all sides of the instrument to permit reading thereof in relatively dark places so that auxiliary artificial light is not necessary.

Another and still further important object of this invention is to provide an underwater instrument with a prism mounted over the face thereof and an outer cover defining an air pocket over the surface of the prism and the outer cover having striations thereon to make it translucent. The cover thus permits passage of light to illuminate the instrument face but simultaneously to prevent direct or downward viewing of the face of the instrument.

Another and further important object of this invention is to provide for the orienting of the gauge or instrument to compensate for the reverse image transmitted or projected from the bottom of the gauge to the top by the prism covering the instrument face.

A still further important object of this invention is to supply an underwater instrument for use by "skin" divers which floats because of a built in air pocket.

Other and further important objects and advantages will become apparent from the disclosures in the following specification and accompanying drawing.

The drawing herein discloses the use of the viewing mechanism of this invention in conjunction with a compass, but it should be understood that the viewing mechanism may be equally well employed with any underwater instrument such as but not limited to a thermometer, depth gauge or time watch.

In the drawing:

FIGURE 1 shows a fragmentary view of an ocean or body of water with a diver swimming therein and wearing a wrist instrument having the viewing mechanism of this invention.

FIGURE 2 is an enlarged side elevational view of a wrist instrument for underwater use with the viewing mechanism of this invention thereon.

FIGURE 3 is a front elevational view of the wrist instrument of FIGURE 2.

FIGURE 4 is a sectional view taken on the line 4—4 of FIGURE 2.

FIGURE 5 is a sectional view taken on the line 5—5 of FIGURE 2.

As shown in the drawing:

The reference numeral 10 indicates generally a body of water into which divers make excursions. A diver designated by the numeral 12 swims in a general horizontal position in his exploration of marine life or in diving for salvage purposes. The wrist-mounted instrument 13 of this invention is shown carried on the wrist or arm of the diver 12. As stated in the objects above it is the function of the viewing mechanism of this invention to permit the diver or user to view a wrist instrument without repositioning his head toward the face of the instrument which normally lies in a plane generally parallel with the surface of his wrist. A diver might very well lose his equilibrium or sense of "attitude" and find it difficult to reestablish his position if he has turned his head and twisted his arm downwardly to see and read the wrist mounted instrument.

As best shown in FIGURES 2 and 3, the instrument 13 has a bracket member 14 which is substantially arcuate in shape and conforms quite closely to the surface of a user's wrist. Slots 15 and 16 are provided in the bracket member 14 to permit interlacing of a wrist band 17 so that the instrument may be securely clamped to a wearer. The band may be of any material suitable for underwater use, such as a water resistant plastic material. In certain instruments it is desired to allow a free flow of water current between the wrist band and the instrument in order that the body temperature will not influence the instrument operation. In such instances the bracket 14 need not conform so closely to the wearer's wrist and the water in which the instrument is submerger may travel across or along the wrist to provide means to insulate the wearer's body temperature from the instrument.

On top of the bracket 14 is mounted the instrument housing 18. In the present instance the housing 18 encloses a compass or the like 19, such as shown in FIGURE 5. The compass 19 with its face 20 having direction points indicated thereon in a dial formation lies in a plane substantially parallel with the plane of the wrist of the wearer of the instrument. A compass without the viewing mechanism of this invention applied thereover would thus be read directly over the wearer's wrist such that the wearer would have to turn his head downwardly to view the dial or face of the instrument and thus impair his balance or attitude while he is in a body of water, such as shown in FIGURE 1. Or, as an alternative the user would have to move his arm up and turn it at right angles to see an ordinary wrist instrument. This could and often does impair a user's forward vision and such movements of the arm under water are considerably difficult and unnatural.

The rotating compass face carries the usual compass point symbols or designations of North, East, South, and West, reading in a clockwise order when viewed from above the face. In the device of this invention these designations are shifted 180° about the face from the normal alignment of compass symbols so that if one is facing North and has their eyes above the level of the face of the compass the South symbol appears furthermost away, the West symbol is to the person's right, the East symbol is to the person's left, and the North symbol is nearest to the person. For convenience the compass point designations as shown in FIGURE 5 are North at 21, South at 22, East at 23 and West at 24.

A prism 25 is mounted over and covers the compass half nearest to the individual using the compass. The prism projects that half of the compass face 20 over which it is mounted upwardly into a vertical plane. An under surface 26 of the prism lies over and parallel with the face of the compass while a vertical viewing surface 27 of the compass is positioned immediately in front of the person using the compass.

Now again let us consider that a person using the compass is facing North and views the compass face through the vertical surface 27. The North symbol 21 which was nearest to the user when the compass was viewed as in FIGURE 5 without the prism is now at the top of the semicircle indicating that the user is facing North. The half of the compass face beneath the prism has been projected up onto the vertical viewing surface 27. The West symbol 24 remains to the user's right and the East symbol 23 remains to the user's left. This is obviously incorrect as West should be to the left and East to the right. The user must transpose the direction designations which appear on a horizontal or transverse line across the prism face 27. That is, when North is at the top of the projected face 27 the user must know that West is to the left and East to the right. To facilitate using the compass of this invention a second and opposite designation is positioned closely adjacent each of the regular designations. These are preferably in some different style, size or color of type so the user can easily know which designations to read. An auxiliary South symbol 21a is positioned next to the regular North symbol 21. Similarly auxiliary direction symbols 22a, 23a and 24a identify North, West and East respectively adjacent the regular symbols South, East and West respectively. Now when any one of the direction designations is at the top of the viewing face 27 it is a correct compass reading. However, the direction designations on the lateral sides of the compass face must be transposed and the user thus reads the direction designations which are disposed generally radially inwardly, namely, 21a, 22a, 23a, or 24a. For further example, if the user turns toward his right from his original northerly direction through a 90° angle he in fact turns toward the East. The image on the prism viewing screen appears to rotate in a vertical clockwise direction bringing the East symbol 23 uppermost on this semicircular screen. This is obsolutely a true reading, but the transverse symbols must be again transposed and the symbol North shown at 21 is on the right and the symbol South shown at 22 is on the left. Thus the user must read the auxiliary designations at 22 for North on the left and 21a for South on the right.

To facilitate accurate reading of the compass a scribe line 26a is provided in a central position through the under face 26 of the prism 25. This permits the user to insure head on or direct reading of direction lines as the scribe line 26a is also projected upwardly by the prism onto the reading face 27. Without such a scribe or locating line 26a a user might well be viewing the compass at an angle without knowing it. Such angular viewing could effect a slight mis-reading of the compass and it is the purpose of the scribe line 26a to prevent such an occurrence.

The compass housing 18 is preferably made of some water-proof plastic, such that when the instrument is carried in and under water it will have no deleterious effects on the interior or working mechanism of the compass or other instrument on which the viewing mechanism of this invention is mounted. The prism 25 is mounted directly over the face 20 of the compass 19 and it is suitably covered and surrounded by an upward continuation of the housing 18 as shown at 18a. If it is desired the plastic housing may be arranged to magnify the viewing face 27 of the prism 25.

The inside of the upper curved housing 18a is provided with a plurality of lines, scratches, striations or serrations 28 extending from a position immediately above the compass face 20 and extending over the top of the prism 25 and joining the front face 27 thereof. The striations 28 on either the inside or outside of the clear, preferably colorless plastic housing or cover 18a makes the plastic translucent to permit external light rays to reach through to the prism and thence to the compass face 20 from all directions but prevent a direct reading of the compass face 20, which lies in a plane with the user's wrist. This, of course, aids in any conflict of reading of the compass by the operator or user.

Another feature of this invention is the provision of an air pocket 29 which is disposed over the rear hypothenuse face or plane 30 of the prism 25 and beneath the outer striated cover 18a. This air pocket prevents any neutralizing or cancelling effect of water on the prism. If the prism 25 were immersed in a body of water without any shield there could be no bending of the light rays passing therethrough at substantially 90°, such as is necessary for the compass disclosed herein. This is true because the index of refraction of the plastic prism is measured by a number possibly close to 1.53 which is the same or nearly the same as the index of refraction of water represented by the number 1.4. Consequently, the two materials, as far as light transmission is concerned, become a single unit of matter if the prism is immersed in a body of water without a separating means. However, the neutralizing effect of the body of water in which the instrument of this invention is immersed is prevented by reason of the air pocket 29 defined over the prism 25 and under the enclosing cover 18a. Thus as a user views the face 27 of the prism 25 he will see the projected image of the compass face 20. Another function of the air pocket is to make the instrument float in water.

In the operation of the viewing mechanism for under water instruments described herein, a user will place the instrument on his wrist as shown in FIGURE 1 of the drawings, and thereupon be immersed in a body of water such as shown at 10. In his explorations the diver 12 swimming in the water mass 10 may view a face 27 of the prism 25 to thereupon indirectly see the flat face 20 of the compass or other like instrument in a vertical plane as a projection of the image of that flat face. By transferring the compass face 20 to a vertical plane on the face 27 of the prism 25 the diver may view the instrument while he is progressing in a generally horizontal or forward direction without lowering his head substantially from a normal forward looking direction and raising his arm to a position within the range of vision of the user who may continue to travel forwardly in a generally horizontally disposed position to view the instrument. This is important to underwater explorers in that they do not lose their attitude and hence retain a sense of balance at all times, which is sometimes difficult to maintain under the adverse conditions existing in bodies of water. The use of a prism 25 in the bending of the light rays from the flat plane of the compass face, which lies parallel with the wearer's wrist, permits the light rays from all directions to be admitted to the compass or other instrument and thus it is possible for the underwater diver to have sufficient light to read the compass dial which has been projected to the vertical face 27 of the prism 25. Obviously the light rays from the sun diminish as you progress deeper into bodies of water and it is essential that all of these rays possible be admitted to the compass or other instrument to give sufficient light for the user to read the inscription thereon. The clear transparent plastic housing in which the instrument, and in this instance the compass is mounted, permits the admission of light rays and by reason of the translucent means and in this case the striations on the inner surface of the covering housing 18a the user may not become confused by reading both faces of the compass simultaneously.

It will thus be understood that the particular mounting of the prism viewing device for instruments of various types for use under water gives the viewer adequate admission of a minimum of light from all directions to the face of the instrument so that the face is sufficiently illuminated for reading by the user without applying auxiliary sources of light whether internal or external. Also, the mounting of the prism with an air pocket behind the hypothenuse face of the bar type prism prevents cancelling of the prism when the prism is immersed in water. The other feature of the housing which includes the translucent creating means in the form of striations or scratches on the internal surface of the covering housing 18a to perform the very desirable function of preventing a direct viewing of the compass face 20 which lies in a plane parallel with the user's wrist and thus becoming confused as to which face of the compass he is actually viewing and reading. Thus the user of the underwater instrument of this invention views that instrument dial or face through the vertically disposed face 27 of the prism 25 on which the projected image of the face is transposed.

I am aware that numerous details of construction may be varied throughout a wide range without departing from the principles disclosed herein and I therefore do not propose limiting the patent granted hereon otherwise than as necessitated by the appended claims.

What is claimed is:

1. A viewing mechanism for an underwater instrument comprising a housing, an instrument mounted within said housing and having a dial for reading directed upwardly therefrom, a prism mounted directly over the dial of the instrument and the housing covering the back side of the prism and forming a water-tight enclosure therearound, said housing spaced from the back side of the prism and defining an air pocket between the prism and the housing to avoid any neutralizing or cancelling effect of the prism when the instrument is immersed in water.

2. A viewing mechanism for an underwater instrument comprising a housing, an instrument mounted within said housing and having a dial for reading directed upwardly therefrom, a prism mounted directly over the dial of the instrument and the housing covering the back side of the prism and forming a water-tight enclosure therearound, said housing surrounding the back side of the prism being translucent to prevent a direct viewing of the normally disposed compass face, and necessitating a viewing through a vertical face on the prism.

3. A device as set forth in claim 1 in which the inside of the housing is striated to shield the dial of the instrument against a direct vertical viewing thereof and yet to permit adequate light to be entrained onto the instrument's dial so that the instrument is sufficiently illuminated for the user to view the face through a vertical side of the viewing prism.

4. An underwater wrist attaching instrument comprising an upwardly facing reading dial, a prism disposed above said upwardly facing reading dial, a generally transparent plastic housing enclosing said instrument and said prism and forming a watertight enclosure therearound, said prism having a generally vertically disposed reading face on which the upwardly facing reading dial of the instrument is projected, said housing spaced from said prism and defining an air chamber between said prism and said housing.

5. An underwater wrist attaching instrument comprising an upwardly facing reading dial, a prism disposed above said upwardly facing reading dial, a plastic housing enclosing said instrument and said prism and forming a watertight enclosure therearound, said prism having a vertically disposed reading face on which the upwardly facing reading dial of the instrument is projected, said plastic housing over said vertically disposed reading face of the prism being transparent, and said plastic housing disposed over the back of the prism being translucent.

References Cited in the file of this patent

UNITED STATES PATENTS

| | | |
|---|---|---|
| 994,901 | Barbow | June 13, 1911 |
| 2,022,516 | Owen | Nov. 26, 1935 |

FOREIGN PATENTS

| | | |
|---|---|---|
| 12,203 | Great Britain | of 1909 |
| 532,973 | Great Britain | Feb. 4, 1941 |
| 543,000 | Italy | May 11, 1956 |